United States Patent [19]

Coop

[11] 3,728,881
[45] Apr. 24, 1973

[54] METHOD AND APPARATUS FOR JOINING SHEET METAL, AND SHEET METAL JOINTS

[75] Inventor: Vernon W. Coop, Pico Rivera, Calif.
[73] Assignee: Brazil H. Sugden, Bell Gardens, Calif.
[22] Filed: Jan. 18, 1971
[21] Appl. No.: 107,256

[52] U.S. Cl. ................... 72/52, 29/21.1, 29/521, 113/54
[51] Int. Cl. ................... B21d 39/02, B23p 23/00
[58] Field of Search ............... 72/51, 52; 113/54; 29/21.1, 521

[56] References Cited

UNITED STATES PATENTS

| | | | |
|---|---|---|---|
| 2,901,816 | 9/1959 | Smith | 29/21.1 |
| 3,129,489 | 4/1964 | Nelson | 29/521 X |
| 3,250,077 | 5/1966 | Ede | 113/54 X |

Primary Examiner—Charles W. Lanham
Assistant Examiner—R. M. Rogers
Attorney—Angus & Mon

[57] ABSTRACT

A first slit aperture means is formed in a first sheet metal portion and first protruding leg means is formed from the excess metal from the first slit aperture means. A second slit aperture means is formed in a second sheet metal portion and second protruding leg means is formed from the excess metal from the second slit aperture means. The sheet metal portions are then positioned so that a surface of the second sheet metal portion is contiguous to a surface of the first sheet metal portion and so that the second leg means extends through the first slit aperture means. The leg means are then crimped to sandwich the second leg means between the first leg means and a surface of the first sheet metal portion and to sandwich a portion of the first sheet metal portion between the second leg means and a surface of the second sheet metal portion to form the completed joint.

12 Claims, 13 Drawing Figures

PATENTED APR 24 1973 3,728,881

INVENTOR.
VERNON W. COOP
BY
ATTORNEYS.

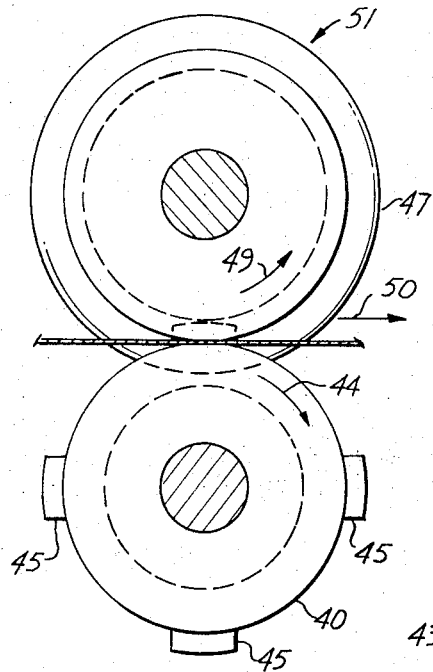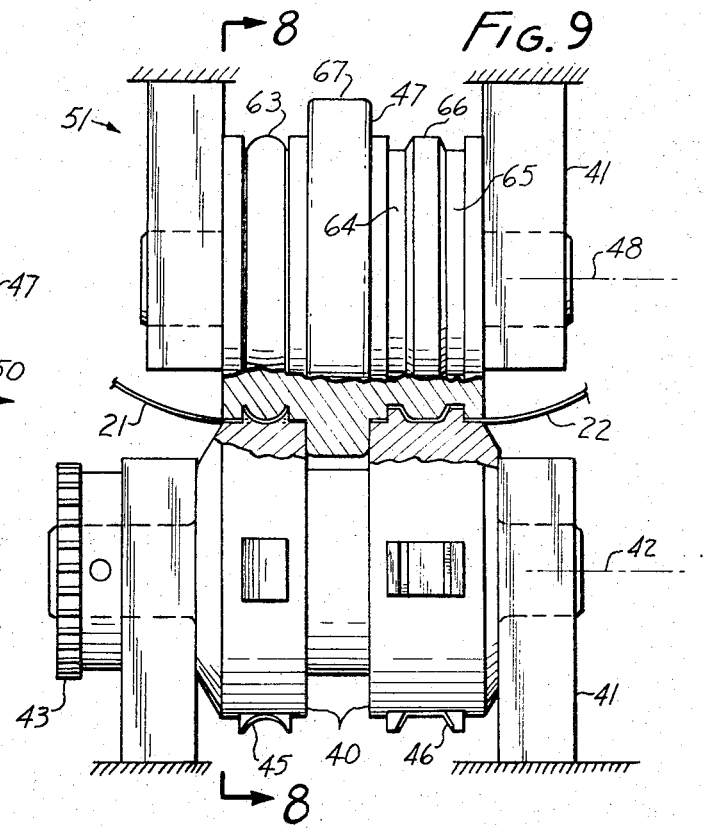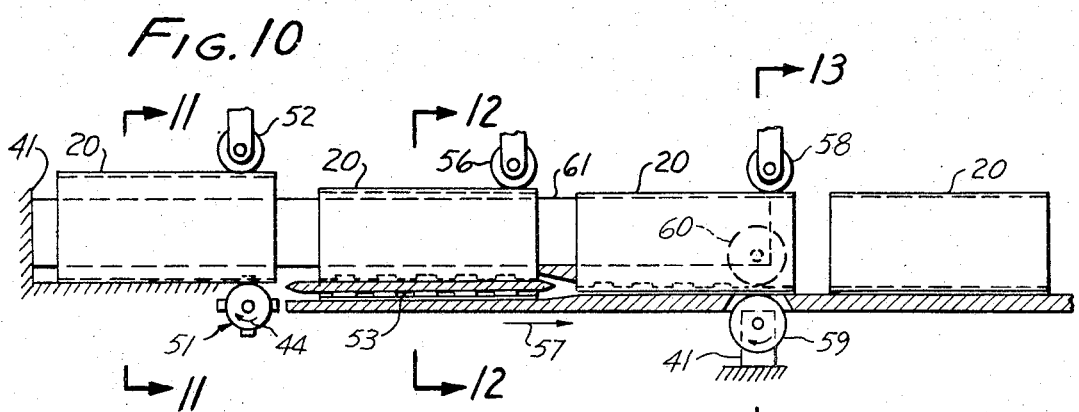

METHOD AND APPARATUS FOR JOINING SHEET METAL, AND SHEET METAL JOINTS this invention relates to metal joints, and particularly to a method and apparatus for joining two metal sheets together, and to the completed joint. The present invention is particularly useful for joining edges of sheet metal to form a tube such as that which might be used as furnace pipe.

Heretofore, sheet metal, such as sheet aluminum, sheet steel, sheet tin, and the like, have been fastened together by rivets, or by rolling and crimping the edges together, or by burring the metals together. In the riveting method, the sheets to be joined are provided with holes or apertures in the region of the intended joint, and the sheets are thereafter overlapped and the apertures in the overlapped portions are aligned. Rivets are placed in the apertures so that opposite heads on the rivets hold the sheets together to form the completed joint. One disadvantage to the use of rivets resides in the fact that a small amount of metal is wasted when the hole or aperture is bored through the sheets to accommodate the rivet. Furthermore, occasionally the opposite heads of each rivet do not fully bear against opposite surfaces of the joint so that fluid leakage through the joint, and also between the joints, might occur. Furthermore, the increased expense represented by the rivets and special tools for handling them render their use costly.

In the "crimp and roll" method, one edge of each sheet to be joined is rolled over to form a U-shaped edge, and the two U-shaped edges are interlocked. The joint is then crimped so that the U-shaped portions bear against each other thereby forming a seam along the joint between the two metal sheets. One advantage to the "crimp and roll" method resides in the fact that there is no wasted metal and a substantially complete fluid seal is provided at the joint. However, the successive steps of rolling each edge to be joined, thereafter joining the edges and thereafter crimping the joint is relatively expensive and can only be accomplished by complicated and expensive machinery.

In the "burring" method, the two sheets to be joined are overlapped and a hole is punched through both sheets so that the burr comprising the excess metal from the hole of one sheet grips the hole formed in the other sheet. An inherent disadvantage in the "burring" method resides in the fact that a hole is left through both sheets so that the joint is not fluid tight.

The present invention provides a joint between two metal sheets in fluid sealing relation. The process can be accomplished in a continuous operation so that the metal sheets can be advanced through a machine which forms and completes the joint and the finished product may be removed from the machine.

It is an object of the present invention to provide a joint for mechanically holding several sheets of metal, which joint can be manufactured in a continuous operation without wasted metal, and provides a fluid seal between the sheets.

Another object of the present invention is to provide a method and apparatus for joining sheet metal together to form a fluid sealing joint, and which can be accomplished in a continuous operation.

In accordance with the present invention, the sheets to be joined are provided with slit apertures, the excess metal from one set of slits in one sheet forming one set of legs which can be fitted into the slit apertures formed in the other sheet. Thereafter, the joint is crimped so as to sandwich the legs formed from the slits in the one sheet between the legs formed from the slits of the other sheet and the other sheet itself, and to crimp the metal adjacent to the slits in said other sheet in the slit formed in said one sheet.

One feature of the present invention resides in the fact that the joinder of the two sheets may be accomplished in a continuous operation wherein the slits are formed in a first stage, are thereafter aligned in a second stage, and are thereafter crimped in a third stage.

Another feature of the present invention resides in the provision of apparatus for forming the slits in the sheets to be joined, which apparatus thereafter aligns the slits and mates the legs, and thereafter crimps their junction to form the completed joint.

Another feature of the present invention resides in the fact that a fluid-sealing seam may be provided between two sheets of metal by spaced-apart joints in accordance with the present invention which are placed at intervals along the length of the junction of the sheets.

The above and other features of this invention will be fully understood from the following detailed description and the accompanying drawings, in which.

Figure 6:
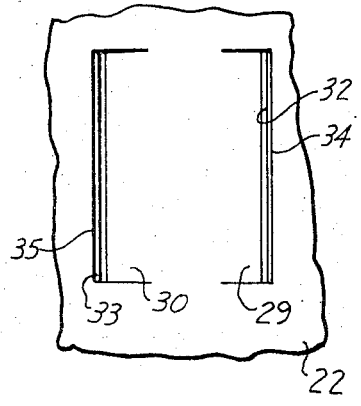
Figure 5:
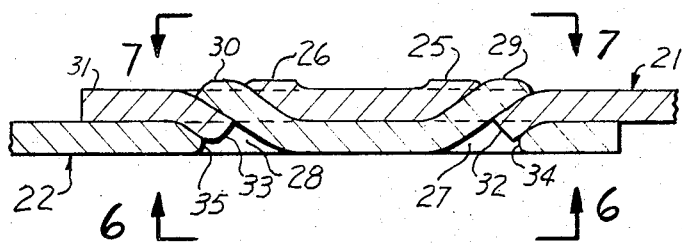
FIG. 5 is a section view as in FIG. 4 showing the completed joint in accordance with the presently preferred embodiment of the present invention, FIG. 5 being taken at line 5—5 in FIG. 1.
Figure 7:
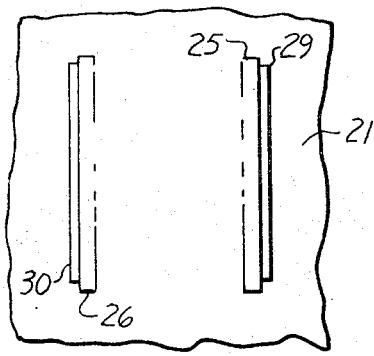

FIGS. 6 and 7 are planar elevations of the completed joint taken at lines 6—6 and 7—7, respectively, in FIG. 5;

FIG. 8 is a side view elevation partly in cutaway cross-section, of apparatus for forming the slits in two sheets to be joined;

FIG. 9 is a front view elevation of the apparatus illustrated in FIG. 8, FIG. 8 being taken at line 8—8 in FIG. 9;

FIG. 10 is a schematic diagram of apparatus and the operation of the apparatus for forming the joint in accordance with the presently preferred embodiment of the present invention; and FIGS. 11, 12 and 13 are section views of successive stages of the operation of the apparatus illustrated in FIG. 10, taken at lines 11—11, 12—12 and 13—13 in FIG. 10, respectively.

Figure 1:
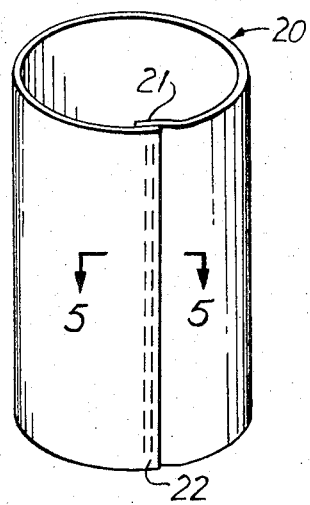
FIG. 1 is a perspective view of a portion of furnace pipe having a seam formed by joints in accordance with the presently preferred embodiment of the invention.

Referring to the drawings, and particularly to FIG. 1, there is illustrated a furnace pipe 20 having a seam formed by joints in accordance with the presently preferred embodiment of the invention. Pipe 20 may be constructed of a sheet of suitable tin, aluminum or steel, or the like. Pipe 20 includes overlapping portions 21 and 22 which together form a seam for pipe 20. The overlapping portions are sometimes referred to as "sheets," even though they are parts of the same piece of material.

Figure 2:
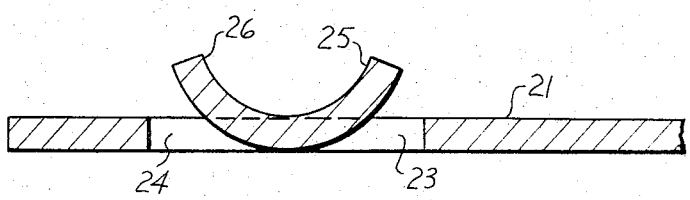
FIGS. 2 and 3 are section views of the slits formed in the respective sheets to be joined.
Figure 3:
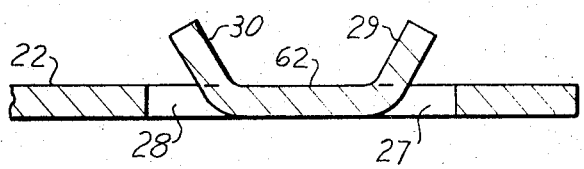

As illustrated particularly in FIG. 2, portion 21 is provided with a pair of slits 23 and 24, the excess metal from slits 23 and 24 forming legs 25 and 26, respectively. Likewise, as illustrated in FIG. 3 slits 27 and 28 are provided in portion 22 to form legs 29 and 30 from the excess metal from the respective slits. Legs 25 and 26 form a continuous section of metal between slits 23 and 24 to define a substantially U-shaped section, each leg of the U forming a separate leg 25, 26. Likewise, legs 29 and 30 form a continuous section of metal between slits 27 and 28 to define a trough-shaped section having a lower flat portion 62 in substantially the same plane as the top surface of portion 22, each leg of the trough section forming a separate leg 29, 30. The lateral distance between the extreme edges of slits 27 and 28 is greater than the lateral distance between the extreme edges of slits 23 and 24, and legs 29 and 30 are so disposed as that legs 29 and 30 can extend through slits 23 and 24 so that the upper most portion of legs 29 and 30 protrude above the level of surface 31 of plate 21. Slits 23 and 24, and the respective legs 25 and 26, are disposed in a substantially parallel, side-by-side relation, relative to the longitudinal direction of the seam.

Figure 4:
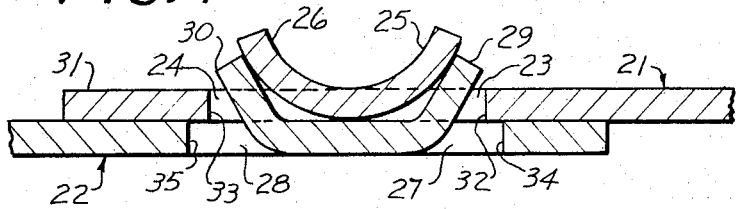
FIG. 4 is a section view as in FIGS. 2 and 3 showing the sheets aligned in position to be crimped.

After slits 23, 24, 27 and 28 have been formed in portions 21 and 22, legs 29 and 30 are fitted in slits 23 and 24, respectively, so as to extend through the slits and the upper most portion of legs 29 and 30 protrude above surface 31 of portion 21, as shown in FIG. 4. Thereafter, and as illustrated particularly in FIG. 5, the junction is crimped, thereby bending legs 25, 26, 29 and 30 to sandwich leg 29 between leg 25 and the upper surface 31 of portion 32 of sheet metal portion 21 adjacent slit 23, to sandwich leg 30 between leg 26 and the upper surface 31 of portion 33 of sheet metal portion 21 adjacent slit 24 of portion 33 of sheet metal portion 21 adjacent slit 24, to sandwich portion 32 in slit 27 between leg 29 and portion 34 of sheet metal portion 22, and to sandwich portion 33 of portion 21 between leg 30 and portion 35 of sheet metal portion 22. The resulting joint is illustrated in elevation in FIGS. 6 and 7 and provides a seal between portions 21 and 22 to interlock these portions without wasted metal and without the use of additional fasteners.

As illustrated particularly in FIG. 7, it is preferred that slits 23 and 24 be slightly longer in length than slits 27 and 28 so that legs 29 and 30 can be easily assembled to slits 23 and 24.

FIGS. 8 and 9 illustrate the cutting mechanism for forming the slits in portions 21 and 22 of tube 20. As illustrated in FIGS. 8 and 9, a cutting wheel 40 is journaled to housing 41 to rotate about axis 42. Gear 43 is mounted to cutting wheel 40 and is adapted to be driven by suitable drive means (not shown) so as to rotate the cutting wheel 40 about axis 42 in the direction of arrow 44. A plurality of first cutting heads 45 are mounted to cutting wheel 40 and are so sized as to form the slits 23 and 24 and legs 25 and 26 in portion 21 (see FIG. 2). As shown in FIG. 9, cutting heads 45 are substantially U-shaped, having thin cutting edges at the extremities of the legs of the U to cut the extreme edges of slits 23 and 24. Likewise, cutting heads 46 are attached to wheel 40 and are so sized as to form slits 27 and 28 and the associated legs 29 and 30 in portion 22 of the sheet. Cutting heads 46 are substantially trough-shaped having their cutting edges at the extremities of the trough to cut the extreme edges of slits 27 and 28.

Follower wheel 47 is journaled to housing 41 and is adapted to rotate about axis 48 in the direction of arrow 49. Follower wheel 47 includes a substantially inverted U-shaped portion 63 about its circumference to match with cutting heads 45 to receive and form legs 25 and 26 from the excess metal from slits 23 and 24, and includes a pair of annular grooves 64 and 65 separated by cylindrical portion 66 to form a substantially inverted trough-shaped portion about the circumference of wheel 47 to match with cutting heads 46 to receive and form legs 29 and 30 from the excess metal from slits 27 and 28.

In the operation of the cutting apparatus illustrated in FIGS. 8 and 9, the sheet metal portions 21 and 22 are simultaneously fed in the direction of arrow 50. The edges of sheets 21 and 22 abut a shoulder or raised cylindrical portion 67 on wheel 47 whose edges act as alignment means to align the sheets during the cutting operation. Cutting wheel 40 is driven in the direction of arrow 44, thereby moving sheets 21 and 22 forwardly to continuously rotate heads 45 and 46 to punch or cut the respective slits in portions 21 and 22. The legs are bent from the excess metal from the slits by the legs of the respective cutting head. As a result, portions 21 and 22 are provided with matable slits and legs as illustrated in FIGS. 2

The slits and legs are provided in two parallel "tracks", one "track" comprising slits 24 and 28 and legs 26 and 30, and the other "track" comprising slits 23 and 27 and legs 25 and 29, all of which are repeated as shown in FIG. 1.

With reference to FIGS. 10–13, the operation of the continuous feed of cutting and crimping apparatus can be described in detail. In the left hand portion of FIG. 10, a sheet of metal is rolled into the general shape of pipe 20, and the edges later to be overlapped are spaced slightly apart (FIG. 11) so that the edges may be fed into the cutter mechanism illustrated generally at 51 and shown and described in detail with respect to FIG. 9. A plurality of rollers 52 are provided about the circumference of tube 20 to fix the general shape of the tube during the cutting operation. Cutting mechanism 51 is driven in the direction of arrow 44 to cut the slits in their respective portions 21 and 22 as heretofore described. Tube 20 is then fed to the next section wherein portions 21 and 22 are overlapped as illustrated particularly in FIG. 12. In this section, a spacer bar 53 is provided with opposite legs 54 and 55 so that the edge of portion 22 may be received against leg 55 and the edge of portion 21 may be received against leg 54 in an overlapping relation. Rollers 56 are provided about the periphery of tube 20 so as to slightly reduce the diameter of tube 20 to form the overlapping relationship between portions 22 and 21.

Tube 20 continues to move in the direction of arrow 57 past the downstream terminal end of spacer bar 53 to a third region where the overlapping portions 21 and 22 are mated to assume the position illustrated in FIG. 4 so that legs 29 and 30 are received in slits 23 and 24. Rollers 58 are provided about the periphery of tube 20 to hold tube 20 in its intended shape and to assure proper matching of legs 29 and 30 within slits 23 and 24. Pressure rollers 59 and 60 are applied to the opposite surfaces of the assemblage of portions 21 and 22 so as to crimp the legs to form the joint as illustrated in FIGS. 5–7. Also, the regions of portion 21 and 22 between the slits are pressed together by the rollers to complete the fluid tight seam. Preferably, roller 59 is journaled to housing 41 and is provided with a serrated or knurled edge. Roller 60 may be attached to a housing 61 which extends along the length of tube 20 and is likewise mounted to housing 41. Pressure rollers 59 and 60 bear against the joint to crimp the legs as heretofore described, thereby forming the completed joint illustrated in FIGS. 5-7. The completed tube 20 proceeds forwardly toward the right hand portion of FIG. 10.

One feature of the present invention resides in the fact that the seam provided by the joint in accordance with the present invention is substantially free from fluid leaks. In one example, a continuous seam for furnace pipe was formed having slit joints formed in accordance with the present invention having a length of approximately 5/16 inch, and spaced along the seam of the joined ends of the furnace pipe so that a ¾ inch space appeared between each joint. The rigid mechanical connection formed by the contiguous metal portions of the joint in accordance with the present invention provided a substantially fluid sealing seam for the furnace pipe. Another feature of the present invention resides in the fact that the method and apparatus for forming joints in accordance with the present invention is capable of forming seams or joints between sheet metal portions of various thicknesses. For example, seams formed in accordance with the present invention have been formed for relatively thick sheet metal portions as well as for sheet metal of relatively thin stock. Heretofore, it has not been feasible to fasten relatively light sheet metal, such as metal having a thickness of about 0.020 inch, by any method other than by welding or soldering the seam. Particularly, it has not been feasible to form seams for fastening thin stock tin plate having a thickness of 0.020 inch by crimping, rolling or even riveting. With the present invention, it is now possible to utilize the same type of seam for various thicknesses of sheet metal, including metal that has previously only been fastened by welding.

The apparatus according to the present invention provides a continuous operation for forming seams to hold together sheet metal portions. Although the present invention has been described in connection with the construction of tubular members, it is to be understood that the invention is equally applicable to forming a joint or seam between two flat members merely by positioning them in the respective cutting wheels and forwarding the plates having the slits formed by the cutting wheels into the roller mechanism to crimp the joined sheets in the manner herein described.

The apparatus according to the present invention forming a seam or a joint requires little maintenance and can be operated in a continuous operation with the present invention so that salvage and clean up operations are minimized. Nor are additional fasteners such as rivets, utilized to complete the joint, thereby realizing a savings in the fabrication of the joint.

This invention is not to be limited by the embodiments shown in the drawings and described in the description, which are given by way of example and not of limitation, but only in accordance with the scope of the appended claims.

I claim:

1. Apparatus for joining together two sheet metal portions comprising: first means for forming a first slit in a first of said sheet metal portions and for forming a first leg from the excess metal from said first slit, which leg protrudes from one surface of said first sheet metal portion; second means for forming a second slit in a second of said sheet metal portions and for forming a second leg from the excess metal from said second slit, which leg protrudes from one surface of said second sheet metal portion; positioning means for positioning said first and second sheet metal portions so that said one surface of said second sheet metal portion is contiguous to a surface opposite said one surface of said first sheet metal means and so said second leg extends through said first slit; and crimping means for crimping said first and second legs to sandwich said second leg between said first leg and a portion of said one surface of said first sheet metal portion, said first and second sheet metal portions comprising opposite edge portions of a metal sheet, said metal sheet being rolled to form a tube, whereby said apparatus forms a seam between said first and second sheet metal portions to complete said tube.

2. Apparatus according to claim 1 wherein said crimping means further sandwiches a portion of said first sheet metal portion between said second leg and a portion of said one surface of said second sheet metal portion.

3. Apparatus according to claim 1 wherein said first means comprises first cutter means for cutting said first sheet metal portion and for bending said first leg from the plane of said first sheet metal portion to form said first slit, and said second means comprises second cutter means for cutting said second sheet metal portion and for bending said second leg from the plane of said second sheet metal portion to form said second slit.

4. Apparatus according to claim 3 wherein said first cutter means includes a first pair of cutter blades arranged in substantially parallel relation to form a pair of said first legs and slits, said first pair of cutter blades being so disposed and arranged as to form said first pair of legs between the individual ones of said first pair of slits, and said second cutter means includes a second pair of cutter blades arranged in substantially parallel relation to form a pair of said second legs and slits, said second pair of cutter blades being so disposed and arranged as to form said second pair of legs between the individual ones of said second pair or slits, in which said positioning means positions said first and second sheet metal portions so that the individual ones of said second pair of legs extend through individual ones of said first pair of slits, and in which the members of the pairs of legs and slits extend along a pair of parallel "tracks."

5. Apparatus according to claim 4 wherein said first cutter means includes a first cutting wheel supporting a plurality of said first pairs of cutting blades and said second cutter means includes a second cutting wheel supporting a plurality of said second pairs of cutting blades, drive means for rotating said first and second cutting wheels and for moving said first and second sheet metal portions to form a plurality of pairs of first and second slits and legs in the respective first and second sheet metal portions, said positioning means positioning said plurality of pairs of first and second slits so that each of said second pairs of legs extend through respective ones of said first pairs of slits, said crimping means crimping said first and second pairs of legs to sandwich each of said second pairs of legs between respective ones of said first pairs of legs and a respective portion of said one surface of said first sheet metal portion to thereby form a seam joining together said first and second sheet metal portions.

6. Apparatus according to claim 5 wherein said crimping means further sandwiches a respective portion of said first sheet metal portion between the individual ones of said second pairs of legs and a respective portion of said one surface of said second sheet metal portion.

7. Apparatus for joining together two sheet metal portions comprising: first means for forming a first slit in a first of said sheet metal portions and for forming a first leg from the excess metal from said first slit, which leg protrudes from one surface of said first sheet metal portion; second means for forming a second slit in a second of said sheet metal portions and for forming a second leg from the excess metal from said second slit, which leg protrudes from one surface of said second sheet metal portion, said first means comprising first cutter means for cutting said first sheet metal portion and for bending said first leg from the plane of said first sheet metal portion to form said first slit, and said second means comprises second cutter means for cutting said second sheet metal portion and for bending said second leg from the plane of said second sheet metal portion to form said second slit, said first cutter means including a first pair of cutter blades arranged in substantially parallel relation to form a pair of said first legs and slits, said first pair of cutter blades being so disposed and arranged as to form said first pair of legs between the individual ones of said first pair of slits, and said second cutter means including a second pair of cutter blades arranged in substantially parallel relation to form a pair of said second legs and slits, said second pair of cutter blades being so disposed and arranged as to form said second pair of legs between the individual ones of said second pair of slits, the members of the pairs of legs and slits extending along a pair of parallel tracks; positioning means for positioning said first and second sheet metal portions so that said one surface of said second sheet metal portion is contiguous to a surface opposite said one surface of said first sheet metal means and so that the individual ones of said second pair of legs extend through individual ones of said first pair of slits; and crimping means for crimping said first and second leg to sandwich said second leg between said first leg and a portion of said one surface of said first sheet metal portion, said crimping means further sandwiching a portion of said first sheet metal portion between said second leg and a portion of said one surface of said second sheet metal portion.

8. Apparatus according to claim 7 wherein said first and second sheet metal portions are opposite edge portions of a metal sheet, said metal sheet being rolled to form a tube, whereby said apparatus forms a seam between said first and second sheet metal portions to complete said tube.

9. Apparatus according to claim 7 in which the pairs of cutter blades are in substantially side-by-side relationship.

10. Apparatus according to claim 9 wherein said first cutter means includes a first cutting wheel supporting a plurality of said first pairs of cutting blades and said second cutter means includes a second cutting wheel supporting a plurality of said second pairs of cutting blades, drive means for rotating said first and second cutting wheels and for moving said first and second sheet metal portions to form a plurality of pairs of first and second slits and legs in the respective first and second sheet metal portions, said positioning means positioning said plurality of pairs of first and second slits so that each of said second pairs of legs extend through respective ones of said first pairs of slits, said crimping means crimping said first and second pairs of legs to sandwich each of said second pairs of legs between respective ones of said first pairs of legs and a respective portion of said one surface of said first sheet metal portion to thereby form a seam joining together said first and second sheet metal portions.

11. Apparatus according to claim 7 wherein said crimping means further sandwiches a respective portion of said first sheet metal portion between the individual ones of said second pairs of legs and a respective portion of said one surface of said second sheet metal portion.

12. Apparatus according to claim 4 in which the pairs of cutter blades are in substantially side-by-side relationship.

* * * * *

UNITED STATES PATENT OFFICE
CERTIFICATE OF CORRECTION

PATENT NO. : 3,728,881
DATED : April 24, 1973
INVENTOR(S) : VERNON W. COOP

It is certified that error appears in the above-identified patent and that said Letters Patent are hereby corrected as shown below:

[73] Assignee "Brazil H. Sugden" should read --Bazil H. Sugden--

Col. 1, line 3, "this" should read --This--
Col. 2, line 66, '"sheets,"' should read --"sheets", --
Col. 3, line 49, "mechanism" should read --apparatus--
Col. 3, line 67, after "28." insert the following paragraph:
-- The combination of the cutting wheel and cutting heads is sometimes called "cutter means", and the cutting heads are sometimes referred to in this specification and in the claims as "cutter blades". Cutting wheel 40 comprises two "cutting wheels" which respectively mount cutting heads 45 and 46, these two "cutting wheels" being unitarily formed in the illustrated embodiment.--

Col. 4, line 26, after "2" insert --and 3.--
Col. 4, lines 27-28, '"-tracks"' should read --"tracks"--
Col. 6, line 14, "means" should read --portion--
(Cl. 1, line 14), "means" should read --portion--
Col. 6, line 50, "or" should read --of--
(Cl. 4, line 12), "or" should read --of--
Col. 6, lines 56-57, '"-tracks."' should read --"tracks".--
(Cl. 4, lines 17-18), '"-tracks."' should read --"tracks".--
Col. 6, line 60, "cutting" should read --cutter--
(Cl. 5, line 3), "cutting" should read --cutter--
Col. 6, line 62, "cutting" should read --cutter--
(Cl. 5, line 5), "cutting" should read --cutter--

UNITED STATES PATENT OFFICE
CERTIFICATE OF CORRECTION

PATENT NO. : 3,728,881
DATED : April 24, 1973
INVENTOR(S) : VERNON W. COOP

It is certified that error appears in the above-identified patent and that said Letters Patent are hereby corrected as shown below:

Col. 8, line 1, "means" should read --portion--
(Cl. 7, line 34), "means" should read --portion--
Col. 8, line 21, "cutting" should read --cutter--
(Cl. 10, line 3), "cutting" should read --cutter--
Col. 8, line 23, "cutting" should read --cutter--
(Cl. 10, line 5), "cutting" should read --cutter--

Signed and Sealed this sixteenth Day of March 1976

[SEAL]

Attest:

RUTH C. MASON
Attesting Officer

C. MARSHALL DANN
Commissioner of Patents and Trademarks